United States Patent [19]

Jones

[11] Patent Number: 4,954,393

[45] Date of Patent: Sep. 4, 1990

[54] POLYMERIC FILMS

[75] Inventor: Mark A. Jones, Bridgwater, England

[73] Assignee: Courtaulds Films & Packaging (Holdings) Ltd., Somerset, England

[21] Appl. No.: 341,761

[22] Filed: Apr. 21, 1989

[30] Foreign Application Priority Data

May 17, 1988 [GB] United Kingdom ............... 8811643

[51] Int. Cl.⁵ .................... B32B 27/40; B32B 27/32; D04H 1/08
[52] U.S. Cl. .................................. 428/288; 428/290; 428/423.5; 428/424.6; 428/424.4; 428/424.2; 428/475.8; 428/476.1; 428/516; 428/518
[58] Field of Search .............. 428/423.5, 424.6, 424.4, 428/424.2, 475.8, 476.1, 516, 518, 288, 290

[56] References Cited

U.S. PATENT DOCUMENTS 4,361,628 11/1982 Krueger et al. .................. 428/475.8
4,758,454 7/1988 Wood ................................. 428/36

FOREIGN PATENT DOCUMENTS 0017385 10/1980 European Pat. Off. .
0236092 9/1987 European Pat. Off. .
1258772 12/1971 United Kingdom .
1319323 6/1973 United Kingdom .
1380918 1/1975 United Kingdom .
2197253 5/1988 United Kingdom .

*Primary Examiner*—George F. Lesmes
*Assistant Examiner*—Elizabeth M. Cole
*Attorney, Agent, or Firm*—Bacon & Thomas

[57] ABSTRACT

This invention provides multilayer polymeric films including a layer of nylon polymer having a Vicat A(DIN 53460) softening point of not more than 170° C. and being substantially impermeable to styrene, and a layer of a weldable synthetic plastics composition bonded to the layer of the nylon polymer. Such films can be used to recondition pipes, for example sewer pipes. They have the advantage of being resistant to swelling by synthetic resin compositions, particularly styrene, used to impregnate a fibrous mat which is bonded to the film when used to recondition pipes. In addition, the films have shown resistance to puncturing.

10 Claims, No Drawings

POLYMERIC FILMS

This invention concerns polymeric films and in particular multilayer polymeric films.

It has been proposed to recondition pipes, for example sewer pipes, using an impermeable polymeric film securely attached to a fibrous mat, the mat being impregnated with a synthetic resin composition. The synthetic resin composition is cured in situ in the pipe while pressure is applied to the film to cause it to conform to the interior surface of the pipe. One film proposed for the purpose is of polyvinyl chloride or polyurethane, the mat being of polyester fibres melt coated to the film. An alternative proposal is the use of acrylic or polypropylene fibres attached to a polyvinyl chloride or polyurethane film. Curing is, of course, effected using the technique appropriate to the synthetic resin composition which is used, for example by heat or by ultra-violet light.

Unfortunately, the resin composition has been found to attack the impermeable film causing it to become weakly attached to the fibrous mat, or in the extreme it becomes detached. This can be reduced by impregnating the mat with the synthetic resin composition only shortly before it is inserted into the pipe which is to be reconditioned, but this is difficult and inconvenient.

According to the present invention there is provided a multilayer polymeric film comprising a layer of a nylon polymer having a Vicat A (DIN 53460) softening point of not more than 170° C. and being substantially impermeable to styrene, and a layer of a weldable synthetic plastics composition bonded to the layer of the nylon polymer. By the term "substantially impermeable to styrene" we mean that multilayer films of the present invention having thicknesses of at least 150 microns show no measurable permeability to styrene when a carrier gas saturated with styrene at 25° C. and atmospheric pressure is passed over one face of the film. In practice this means a permeability of not more than $2.1 \times 10^{-14}$ g.m/N/sec.

Multilayer films of the present invention have shown good resistance to swelling caused by synthetic resin compositions, particularly to styrene. Films of the invention furthermore have shown particularly good resistance to puncturing when applied to the inside of pipes which are being renovated, due to the ability of these films to stretch.

Although the nylon polymer should have a Vicat A softening point of not more than 170° C., it is preferably less than 150° C. and it can be less than 130° C., e.g. about 120° C. or even less, provided a satisfactory bond can be achieved to the weldable synthetic plastics composition.

Preferred nylon polymers for use in the present invention by virtue of their particularly good barrier properties to synthetic resin compositions conventionally used, and the good adhesion which they exhibit to the weldable synthetic plastics composition, are those containing units from at least two and more preferably at least three nylon monomers. Furthermore, such nylon polymers can often be extruded at relatively low temperatures, for example compared with multilayer films having a layer of a nylon homopolymer. Nylon 6/6.9 polymers are examples of terpolymers which can be used. A particularly preferred nylon polymer by virtue of the good resistance to puncture of the resulting multilayer films produced therefrom, and the good bonding achieved to fibrous mats, is sold under the designation Grilon CF62 by EMS Grilon U.K. Ltd.

The layer of a weldable synthetic plastics composition is preferably a polymer containing units derived from ethylene and at least one of vinyl acetate and acrylic acid, e.g. an ethylene/vinyl acetate copolymer or an ethylene/acrylic acid copolymer; polyvinyl chloride; or a polyethylene ionomer. A particularly preferred weldable synthetic plastics composition is the polyethylene ionomer sold under the designation Surlyn by Du Pont de Nemours.

In a preferred embodiment of the invention, a bonding layer can be provided between the nylon polymer layer and the weldable synthetic plastics composition. The bonding layer can be a coextruded tie layer or a laminating adhesive, depending on the method used to manufacture films of the present invention. Suitable polymeric materials for use as the bonding layer include modified polyolefins, e.g. modified polyethylene or modified polypropylene, polyurethane, polymers containing units derived from ethylene and at least one of vinyl acetate, acrylic acid and lower $C_{1-4}$ alkyl acrylates, e.g. ethyl acrylate, and modified equivalents of such polymers, the modification in each case preferably being by the inclusion of units derived from maleic anhydride.

If desired, in addition to the bonding layer, one or more further layers may be included between the layer of the nylon polymer and the weldable synthetic plastics composition. For example, a polyolefin layer, e.g. of polyethylene, can be included between the layer of the weldable synthetic plastics composition and the bonding layer.

Multilayerr polymeric films of the present invention can be produced to various thicknesses. Typically the layer of the nylon polymer will be from 5 to 80 microns thick, with the weldable synthetic plastics composition being from 50 to 290 microns thick or more, e.g. 500 or more microns thick. The bonding layer can be, for example, 1 to 50 microns thick. The overall thickness of the films will usually depend on the required strength, and typically it will be from 100 to 500 microns.

Multilayer films of the present invention can be produced by coextrusion or by the bonding of mono-webs. When used to recondition pipes, the layer of nylon polymer will previously have a fibrous mat bonded thereto by heating, thereby causing the mat to become embedded in the layer of nylon polymer. The fibrous mat can be made from any of the materials proposed hitherto, for example it can be of polyester, acrylic or polypropylene fibres.

Once the polymeric film of the present invention is bonded to the fibrous mat, the mat can be impregnated with a curable composition, for example a curable resin composition as has been proposed hithero, e.g. a styrene-based composition.

The following Examples are given by way of illustration only.

EXAMPLE 1

A three layer polymeric film was produced by coextruding a 40 micron thick layer of low melting point nylon having a Vicat A softening point of about 120° C. (Grilon CF62 from EMS), a central 15 micron thick tie layer of an ethylene/maleic anhydride copolymer (Admer S3000 from Mitsui) and a third 245 micron thick layer of an ionomer resin (Surlyn 1652-SB1 from Du Pont). The total thickness of the film was 300 microns. The tensile strengths and elongations at break for this film in the machine and transverse directions are given in the Table below.

The nylon layer of this three layer film was then pressed for 15 seconds into contact with a mat of acrylic fibres 4.5 mm thick under a force of 410000 pascals at an interface temperature between the nylon layer and the mat of about 165° C. to produce a bonded composite structure.

The mat of the composite structure was impregnated with a liquid synthetic resin composition consisting of an unsaturated polyester resin in styrene which also included an ultra violet light activatable curing catalyst. The sample was stored for seven days (168 hours) in the dark and then it was examined for any visible change. There was no sign of any swelling or deterioration in the polyethylene ionomer layer nor failure of the bond between the polyethylene ionomer and the nylon layer. This sample was then placed into water at 25° C. and subjected to the action of ultra violet light until the resin had cured to form a hard mass firmly attached to the three layer film. The strength of the bond between the film and the cured resin mass was measured by cutting a 10 mm wide strip from the three layer film and determining the force required to peel the film from the mat (peel strength). The results obtained are shown in the accompanying Table.

EXAMPLE 2

A four layer polymeric film was produced by coextrusion. The layers consisted of an outer, 30 micron thick layer of a nylon 6/12 copolymer (Grilon CA6E from EMS) having a Vicat A softening point of 104° C., a 110 micron thick layer of an ionomer resin (Surlyn 1652SB1 as in Example 1), a 20 micron thick layer of nylon 6 homopolymer (Vicat A softening point 217° C., from EMS), and a futher outer layer 140 microns thick of the ionomer resin used for the second layer.

The resultant multilayer film was then bonded to a mat of acrylic fibres as described in Example 1, the layer of nylon 6/12 being used to effect bonding to the mat. Tensile strength values and percentage elongation at break were measured for the multilayer film before bonding to the acrylic fibres, and the results are given in the Table.

The four layer polymeric film was then bonded to a mat of acrylic fibres as desribed in Example 1, the layer of the nylon 6/12 copolymer being bonded to the fibres. The peel strength of the resultant composite was measured as in Example 1, and the results are given in the Table.

TABLE

|  | Example 1 | Example 2 |
| --- | --- | --- |
| Tensile Strength (MPa) | | |
| MD | 11 | 25 |
| TD | 10 | 24 |
| Elongation at break | | |
| MD | 675 | 371 |
| TD | 620 | 392 |
| Peel Strength (N/cm) | 456 | 350 |

I claim:
1. A multilayer polymeric film comprising a layer of a nylon polymer having a Vicat A (DIN 53460) softening point of not more than 170° C. and being substantially impermeable to styrene, and a layer of weldable synthetic plastics composition bonded to one side of the layer of the nylon polymer and an impregnable fibrous mat bonded directly to the other side of the layer of the nylon polymer.

2. A film according to claim 1, wherein the nylon polymer comprises a nylon 6/6.9 polymer.

3. A film according to claim 1, wherein the weldable synthetic plastics composition comprises an ethylene/vinyl acetate copolymer, an ethylene/acrylic acid copolymer, polyvinyl chloride or a polyethylene ionomer.

4. A film according to claim 1, having at least one further polymeric layer between the nylon polymer layer and the weldable synthetic plastics layer.

5. A film according to claim 1 wherein the fibrous mat is impregnated with a curable resin composition.

6. A film according to claim 1, wherein the fibrous mat is of polyester, acrylic or polypropylene fibres.

7. A film according to claim 6, wherein the fibrous mat is impregnated with a curable resin composition.

8. A film according to claim 1, wherein the bonding is effected by a further layer comprising a coextruded tie layer or a laminating adhesive.

9. A film according to claim 8, wherein the coextruded tie layer comprises a modified polyethylene, a modified polypropylene, a polyurethane, an ethylene/vinyl acetate copolymer, a modified ethylene/vinyl acetate copolymer, an ethylene/acrylic acid copolymer, a polyethylene ionomer, an ethylene/ethyl acrylate copolymer or a modified ethylene/ethyl acrylate copolymer.

10. A film according to claim 9, wherein the modified polymers are modified by copolymerisation with maleic anhydride.

* * * * *